John J. Heigl
James A. Wilson    Inventors
Oliver G. Lewis

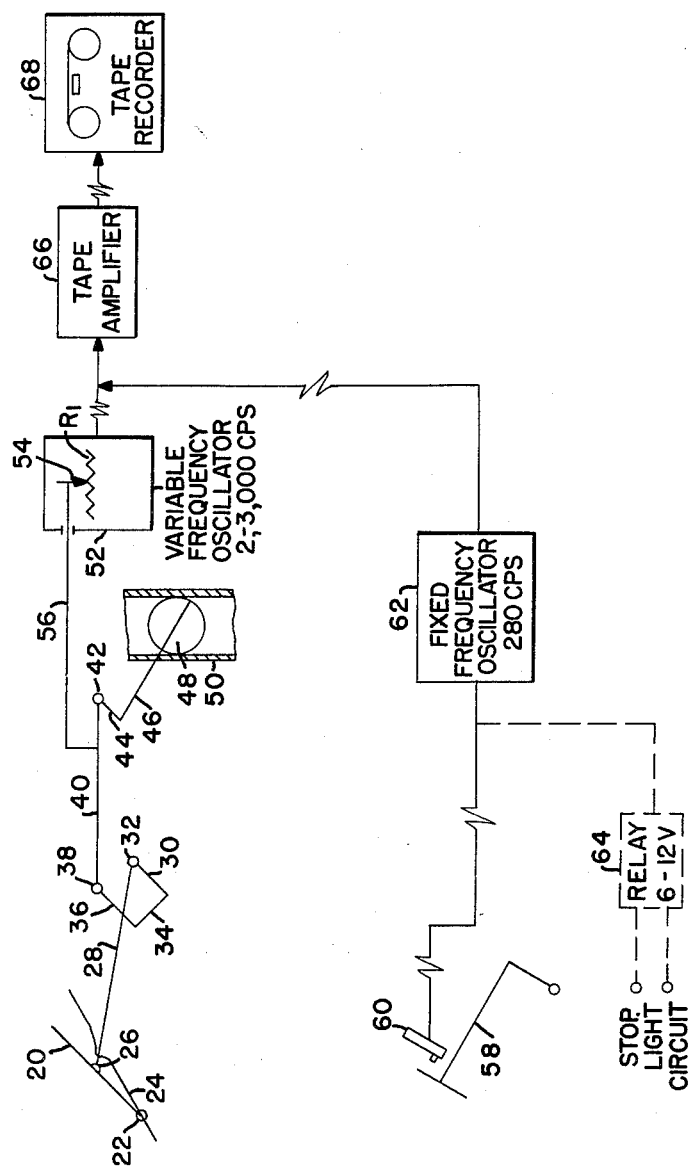

By *Paul O. Dunham* Attorney

Aug. 28, 1962   J. J. HEIGL ET AL   3,050,994
ROAD SIMULATION SYSTEM
Filed July 16, 1958   8 Sheets-Sheet 5

John J. Heigl
James A. Wilson   Inventors
Oliver G. Lewis

By Paul O. Dunham   Attorney

John J. Heigl
James A. Wilson    Inventors
Oliver G. Lewis

John J. Heigl
James A. Wilson    Inventors
Oliver G. Lewis

By  *Paul O. Dunham*  Attorney

United States Patent Office 3,050,994
Patented Aug. 28, 1962

3,050,994
ROAD SIMULATION SYSTEM
John J. Heigl, Short Hills, James A. Wilson, Lake Lackawanna, and Oliver G. Lewis, Westfield, N.J., assignors to Esso Research and Engineering Company, a corporation of Delaware
Filed July 16, 1958, Ser. No. 749,020
8 Claims. (Cl. 73—117)

The present invention relates to a method and means for the accumulation of operational mileage on automotive vehicles. It relates particularly to such method and means in the employment of which the body of the vehicle is maintained stationary while its engine and whole power train are operated under normal "vehicle in motion" conditions in response to a previously coded set of signals, and it relates more particularly to such method and means in the employment of which the aforementioned previously coded set of signals represents operational variables recorded in a master test vehicle.

For the maintenance and improvement of quality of petroleum products manufactured for automotive use it is essential that test data be secured with respect to these products under actual or very accurately simulated driving conditions. In the past it has been the general practice to gather such data by running various makes of automobiles under the control of test drivers on particular roads at regulated speeds and in selected conditions of traffic. After a certain number of miles have been accumulated, measurements of vehicle performance and of properties of petroleum products used in the vehicle are taken with a view toward evaluating the product requirements of the vehicle such as octane number increase and the operating characteristics of the products used in it up to that time. It is customary for this procedure to be carried out periodically at determined intervals such as 1,000 miles, 5,000 miles, 10,000 miles, 50,000 miles, and the like.

While this procedure has been satisfactory to a degree, it does have several disadvantages. For example, a 10,000 mile test run prescribed to be carried out in morning or evening rush hour conditions of city traffic consumes considerable time. On the other hand, when a car can be driven in long-continued segments of a test run such as one of country driving an element of fatigue may affect a driver in a way leading to personal reactions tending to cause him to operate his vehicle in a manner which is not characteristic of a fresh or non-test driver.

To avoid these and other disadvantages of actual road testing, attempts have been made to operate vehicles for extended periods on mileage accumulation dynamometers in response to previously coded signals. Although such dynamometer tests have been suitable for some purposes, they have not been satisfactory in all respects, particularly not in respect of reproducing true road conditions of fuel feed to the engine. This has been because the aforementioned signals have almost always been such to make the vehicle on test respond in a way primarily equivalent to determined rates of over-the-road speed. Why it is that accurate dynamometric tests of automotive engines in particular are not obtained when such speed is the controlling test parameter will be shown presently.

This invention obviates the disadvantages of both the long-continued test of an automotive vehicle on an actual road and dynamometric vehicular tests as these latter tests have been performed heretofore. According to this invention a relatively short test run is made by a master test vehicle under driver control through selected traffic conditions on substantially level streets and highways, and at such speeds as may be desired or permitted. The vehicle must be equipped with an automatic transmission. During this road run, instrumentation in the test vehicle takes a record on magnetic tape of the position of the accelerator pedal under the driver's foot and the impulse application of the foot brake, both with respect to time.

A vehicle or vehicles of a class or classes corresponding generally in speed range to that of the master test vehicle and on which it is desired to accumulate operational mileage are then mounted on a special mileage accumulation dynamometer which makes the vehicles' power trains do work just as on a road. Their engines are operated according to signals obtained by playing back the tape record from the road run. Such playing back may be repeated indefinitely, and thus any desired amount of mileage may be accumulated on a vehicle without ever taking it out on the road. Not only may a substantial reduction in driver expense be effected in this way, but also results of wider applicability than those usually achieved heretofore by actual road testing methods and more significant with respect to engine and fuel performance than those achieved heretofore by dynamometric testing methods in any case may be obtained.

The nature and substance of this invention may be more clearly perceived and fully understood by referring to the following description and claims taken in connection with the accompanying drawings in which:

FIG. 1 represents a block diagram of the pickup system whereby a tape record is made of throttle linkage position and foot brake impulses in a master test vehicle, this system including a resistance-regulated, variable frequency oscillator.

Figure 7:
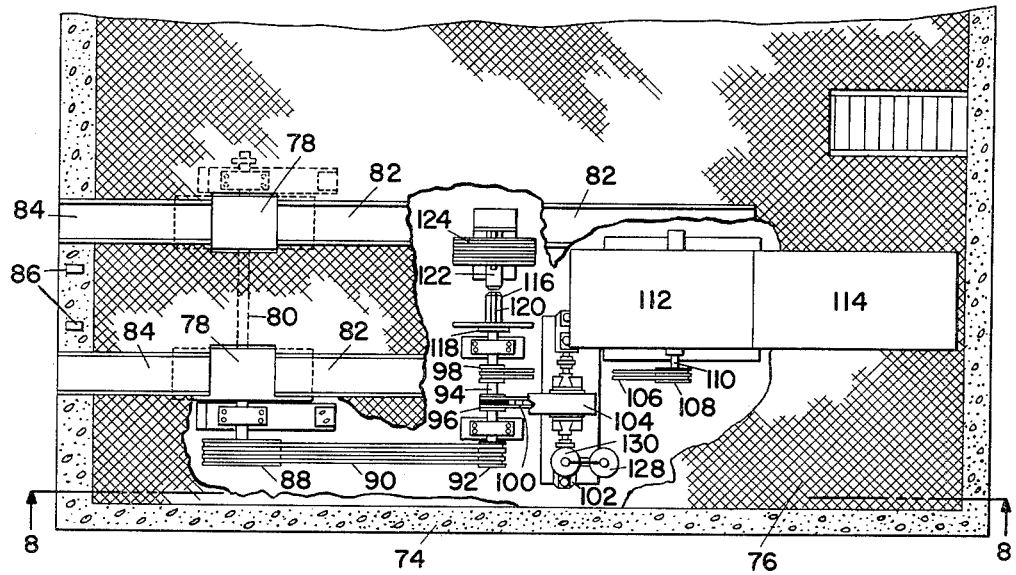
FIG. 7 represents a plan view partly cut away of a typical installation of the mileage accumulation dynamometer of the road simulation system of this invention showing certain major components thereof.
Figure 8:
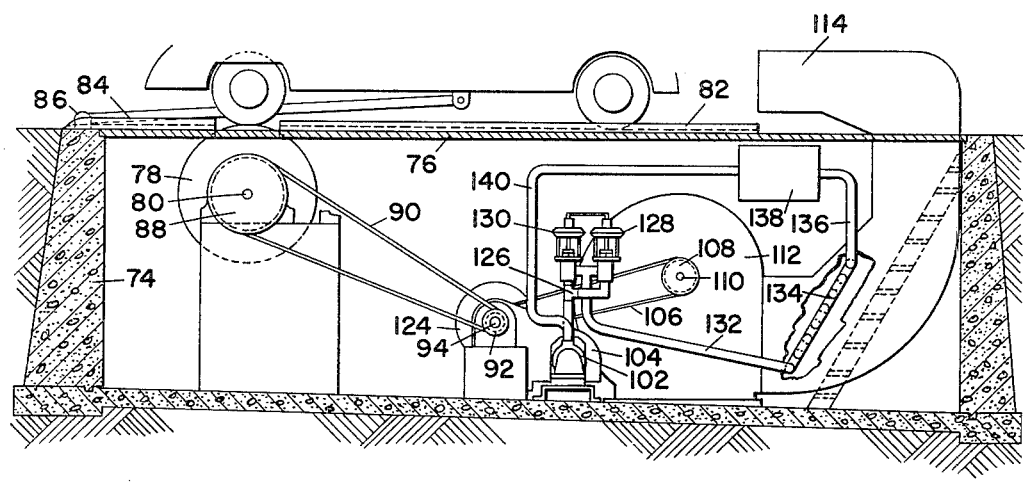
FIG. 8 represents a view in sectional elevation along line 8—8 of FIG. 7.
Figure 9:
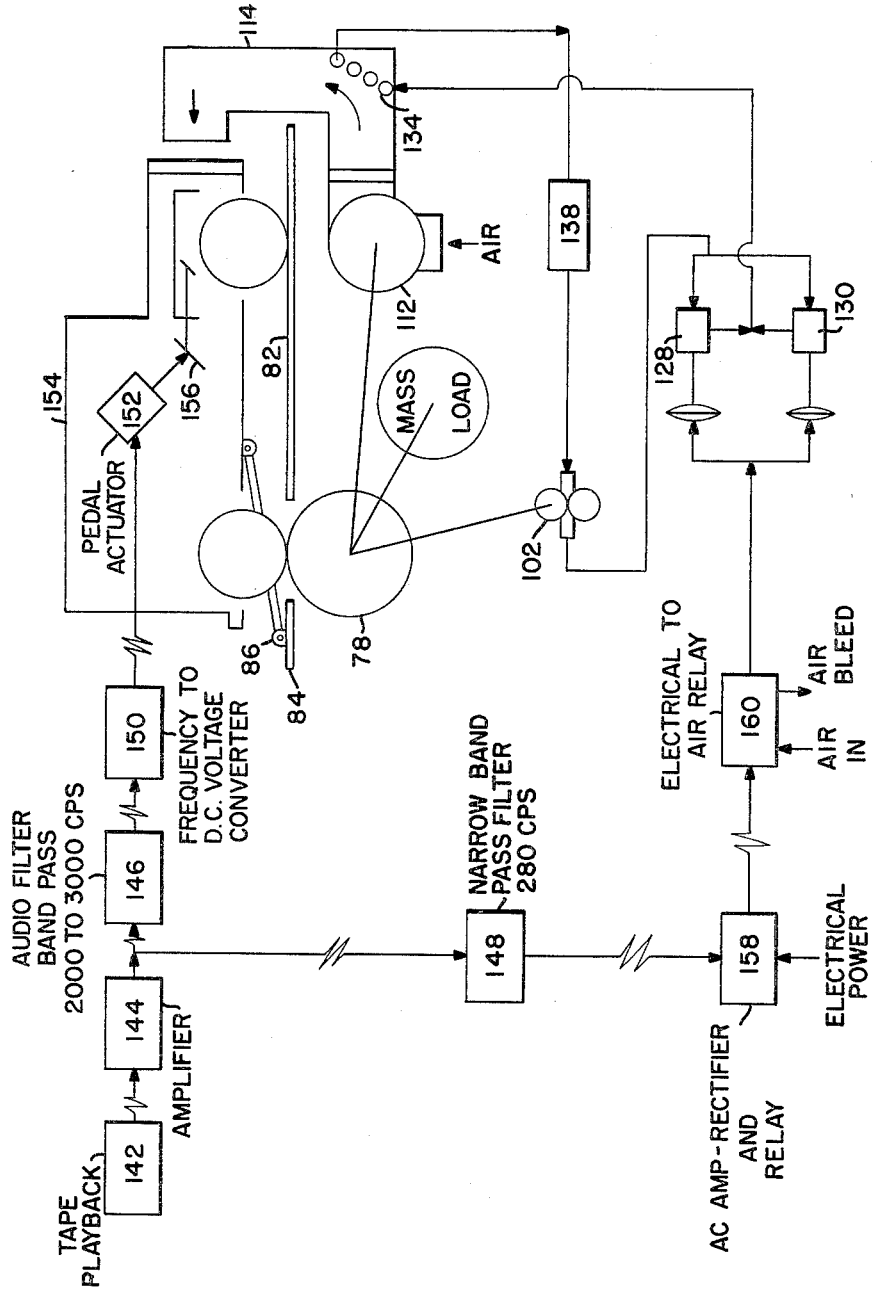

FIG. 9 represents a block diagram of the playback, accelerator pedal actuating, and brake load simulating system whereby a tape record made through the pickup system of FIG. 1 is used to impose conditions of road operation on a vehicle installed for test on the mileage accumulation dynamometer of FIGS. 7 and 8, this playback, accelerator pedal actuating, and brake load simulating system including a frequency to D.C. voltage converter whereby signals are furnished to the accelerator pedal actuating apparatus thereof, and a positive displacement pump and other fluid conveying and flow regulating devices in the brake load simulating apparatus thereof.

Figure 10:
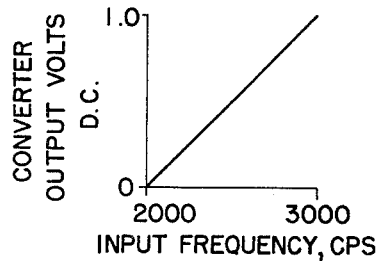

FIG. 10 represents the variation of D.C. voltage output of the frequency to D.C. voltage converter of FIG. 9 with respect to frequency of the input signal to this converter.

Figure 11:
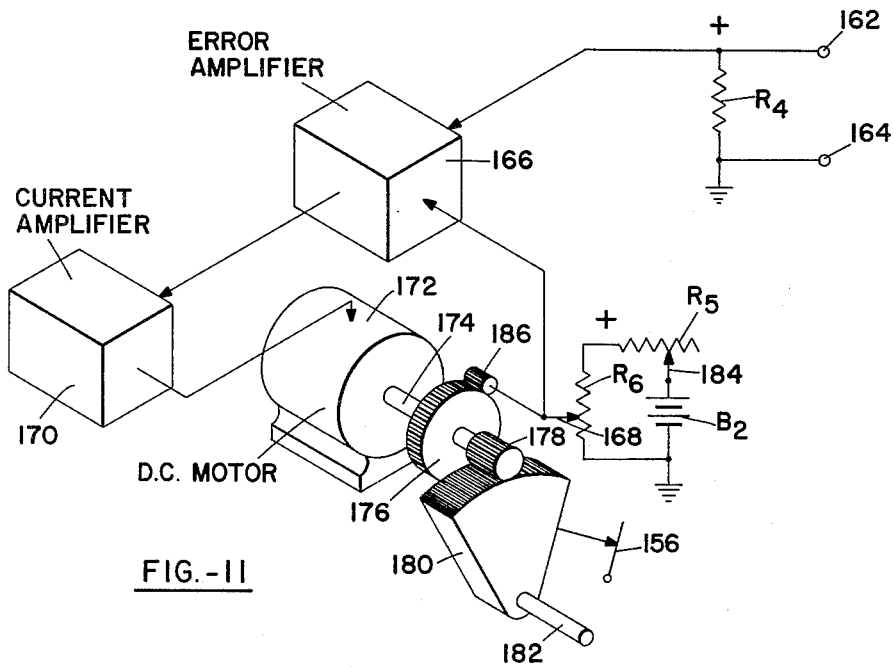

FIG. 11 represents a schematic diagram of the accelerator pedal actuating circuit and mechanism of the system of FIG. 9.

Figure 12:
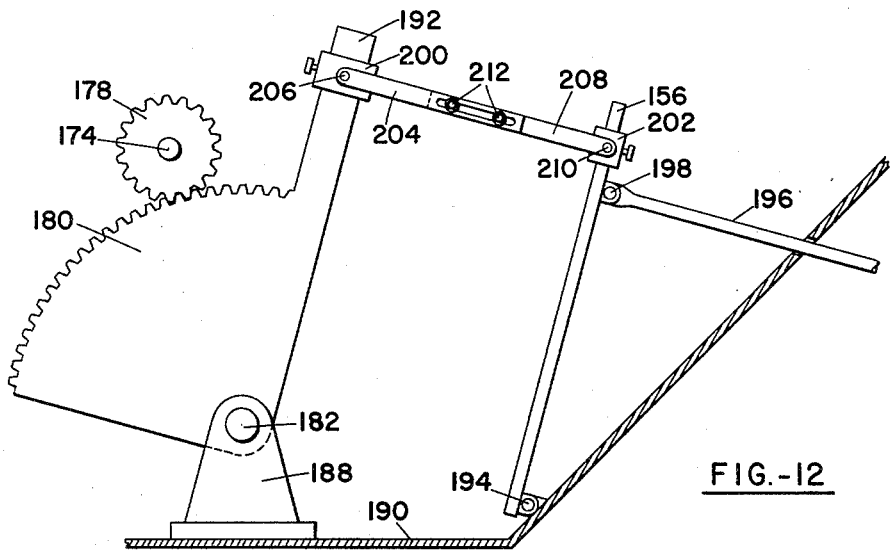

FIG. 12 represents the mechanical means shown diagrammatically in FIG. 11 whereby the accelerator pedal of a vehicle installed for test on the mileage accumulation dynamometer of FIGS. 7 and 8 is actuated.

Figure 13:
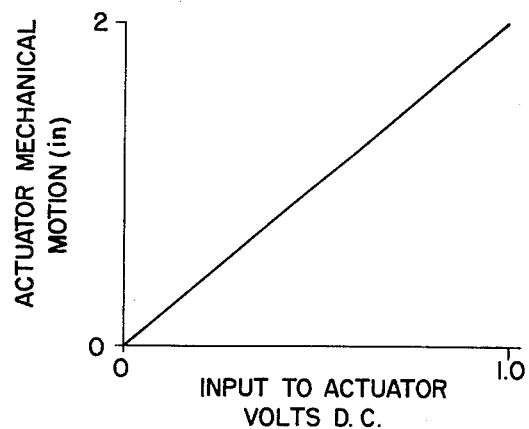

FIG. 13 represents the variation of accelerator pedal actuator position of the mechanical means of FIG. 12 with respect to the D.C. voltage input to the actuating circuit of FIG. 11.

Figure 14:
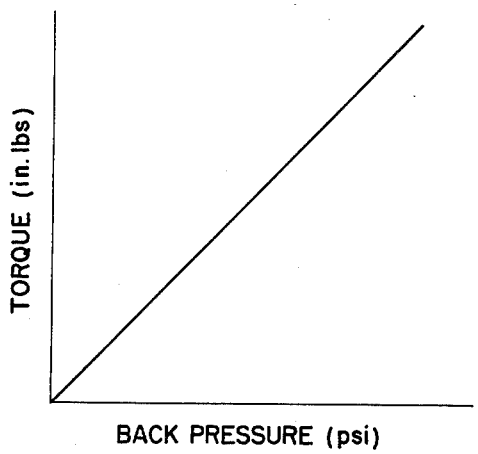

FIG. 14 represents the variation of torque required to drive the hydraulic pump of the brake load simulating apparatus of FIG. 9 with respect to back pressure on this pump.

Now considering the figures in detail, in FIG. 1 the accelerator pedal of the master test vehicle used on a road run under driver control is designated 20. This is pivoted at point 22 to the floorboard 24. Pivoted to the underside of the accelerator at point 26 and running forward through the floorboard is accelerator connecting rod 28. At its forward end, rod 28 is pivoted to a first intermediate crank 30 at the upper end point 32 thereof. Crank 30 is secured non-rotatably at its lower end to intermediate crankshaft 34 on which second intermediate crank 36 is also fixedly secured. At the upper end of crank 36 there is a pivot point 38 from which the throttle connecting rod 40 extends to pivot point 42 on throttle crank 44. The throttle crank actuates the throttle shaft 46 on which is fixedly mounted throttle plate 48 within the intake manifold 50 following the carburetor.

Second intermediate crank 36 and throttle crank 44 are of equal length, and with connecting rod 40 form a parallelogram. First and second intermediate cranks 30 and 36 are of substantially the same length. The lever distance on accelerator pedal 20 between pivot points 22 and 26 is substantially greater than the length of first intermediate crank 30, perhaps three times as great. There will, accordingly, be a multiplication of angular motion through the linkage shown when accelerator pedal 20 is depressed by the driver's foot. When the throttle plate 48 is seated in the fully closed position in manifold 50 it will be at an angle of approximately 25° to a transverse plane through the manifold. It will, accordingly, rotate about 65° to reach a fully open position. The corresponding rotation of the accelerator pedal will be about 20°. These values of angular rotation are approximate only and will vary from vehicle to vehicle, but in all vehicles the accelerator pedal rotation may be expected to be less than that of the throttle plate.

Continuing with the designation of apparatus in FIG. 1, 52 is a resistance-regulated, variable frequency oscillator having an output frequency in the range 2,000–3,000 c.p.s. The regulating resistor of this oscillator is shown as $R_1$, and the slider whereby the effective resistance of this resistor is adjusted as 54. This slider is joined to throttle connecting rod 40 by means of a link 56. Accordingly as accelerator pedal 20 moves under the driver's foot to open or close the throttle, slider 54 will be shifted to make more or less of the total resistance of resistor $R_1$ effective in the circuit of oscillator 52. It is intended that when the accelerator pedal is fully raised from the floorboard, that is, when the throttle is fully shut, the effective resistance of resistor $R_1$ in the oscillator circuit shall be zero with the oscillator having a corresponding output frequency of 2,000 c.p.s. The important concept is that the output signal from oscillator 52 will be continuous, and will be modulated in frequency with respect to throttle position.

The other signal which is important for purposes of this invention is that of foot brake impulse. In FIG. 1 the brake pedal structure is generally designated 58. When this pedal is depressed it may bear upon the button of and so close a switch 60 to energize a fixed frequency oscillator 62 having an output frequency of 280 c.p.s. Instead of using a switch 60 operated directly by the brake pedal to start and stop oscillator 62, switching action may be provided through a relay 64 connected to the stop light circuit. This relay would be matched to the vehicle voltage supply of 6–12 volts. The important concept is that whatever the switching means for oscillator 62, its output signal will be not only of fixed frequency but also of an intermittent or on-off nature, representing simply the application or non-application of the foot brake and being in no wise responsive to the intensity of brake application. The test car driver should maintain the foot brake depressed throughout all stop periods of a road run for reasons to be shown presently.

The output signals of variable frequency oscillator 52 and fixed frequency oscillator 62 are mixed to enter a tape amplifier 66. The output of amplifier 66 in turn constitutes the input to a magnetic tape recorder 68. This recorder and all other equipment shown in FIG. 1 except oscillator 52 may be of any suitable standard design. The tape passed through recorder 68 which is operated continuously in the course of a road run by a master test vehicle will comprise a record of throttle position and brake impulses during this run, both taken with respect to time. It is to be understood, of course, that the pickup system could be arranged for continuous or intermittent recording to operating variables in addition to throttle position and brake impulses. Since this invention lies largely in the utilization of the latter variables, however, the pickup system illustrated is shown as adapted for recording them only.

Figure 2:
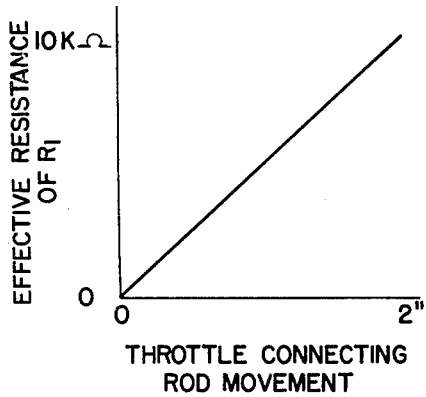
FIG. 2 represents the variation of effective resistance of the regulating resistor of the variable frequency oscillator of FIG. 1 with respect to throttle linkage position.

Referring now to FIG. 2, it is desirable that the variation of effective resistance of regulating resistor $R_1$ of variable frequency oscillator 52 with respect to movement of the throttle connecting rod 40 and link 56 be a linear one as shown. Resistor $R_1$ is taken as having a total resistance of 10,000 ohms which, acting as an effective value, is assumed for purposes of example to correspond with a 2-inch throw of connecting rod 40.

Figure 3:
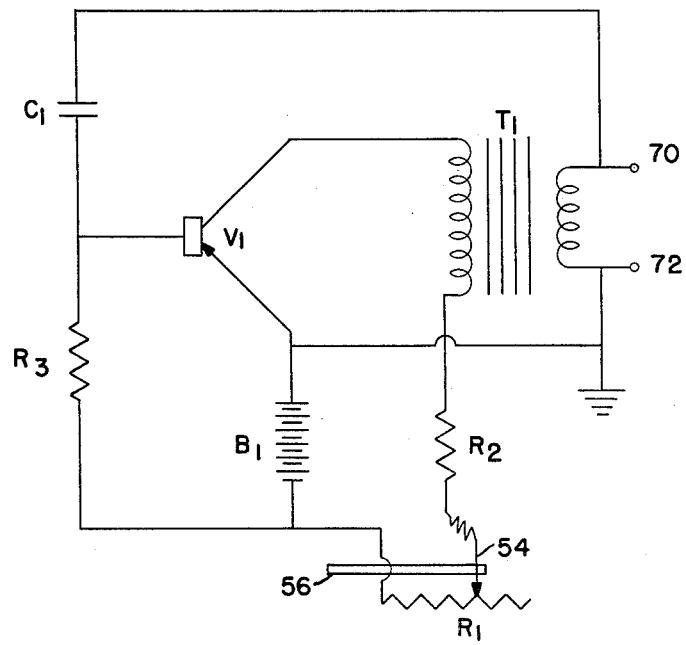
FIG. 3 represents a schematic diagram of the resistance regulated, variable frequency oscillator of FIG. 1.

Referring now to FIG. 3, the circuit diagram of variable frequency oscillator 52, regulating resistor $R_1$ having a total resistance of 10,000 ohms has been identified previously. One end of slider 54 which is actuated by link 56 is shown bearing upon $R_1$. At its other end the slider is joined to the circuit by suitable flexible means. Additional elements of the oscillator circuit are transistor $V_1$, step down transformer $T_1$, battery $B_1$, feedback capacitor $C_1$, linearity resistor $R_2$, and bias resistor $R_3$. The output terminals of the oscillator are 70 and 72. Appropriate values for circuit elements besides $R_1$ are $V_1$, a type 2N107 transistor; $T_1$, 10:1 step down ratio; $B_1$, 16 volts; $C_1$, .05 microfarad; $R_2$, 3,000 ohms, and $R_3$, 90,000 ohms. The output frequency, as stated previously, will be in the range 2,000–3,000 c.p.s. depending upon the setting of slider 54 on $R_1$.

Figure 4:
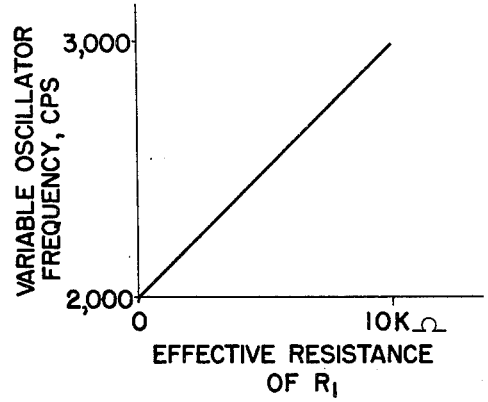
FIG. 4 represents the variation of output signal frequency of the resistance-regulated, variable frequency oscillator of FIG. 3 with respect to the effective resistance of the regulating resistor thereof.

Referring now to FIG. 4, it is desirable that the variation of output signal frequency of variable frequency oscillator 52 whatever the form of the oscillator, and it may assume numerous forms other than resistance-regulated, be linear with respect to throttle linkage position. Accordingly, in view of what has been disclosed already, the circuit design of oscillator 52 appearing in FIG. 3 and the values of circuit elements given above are such to provide a linear variation of output frequency from 2,000 to 3,000 c.p.s. with respect to effective resistance of $R_1$ as shown. Applying the relation shown in FIG. 2, it is evident that oscillator output frequency will vary linearly with throttle linkage position, the desired circumstance.

The resistance-regulated circuit is selected for variable frequency oscillator 52 because of its relative simplicity and ease of utilization in this invention, but circuits regulated by voltage, current, capacitance, or inductance could be used and results achieved similar to those related above. It should be remembered that the function of the variable frequency oscillator is simply that of a transducer converting mechanical motion to a change in an audio output frequency.

Figure 5:
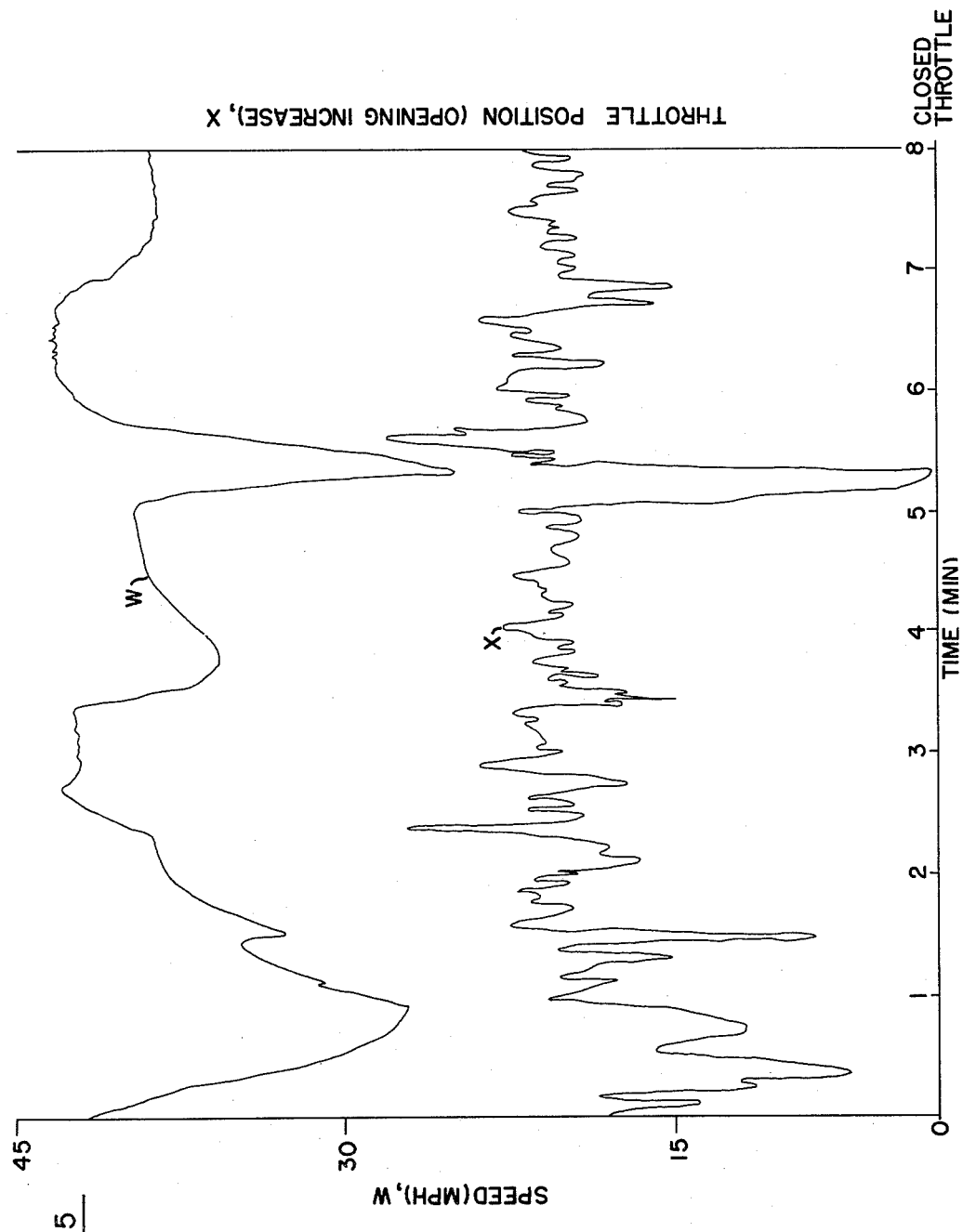
FIG. 5 represents graphical records of throttle linkage position and over-the-road speed of a typical passenger vehicle taken during level highway driving.

Referring now to FIG. 5, the upper plot W is a graphical record against time of over-the-road speed of a driver-controlled, typical passenger vehicle taken during level highway driving, while the lower plot X is a record of throttle position taken simultaneously with plot W in the same vehicle. These plots show that while there is a general correspondence of increased or decreased throttle opening with increased or decreased speed there is no specific correlation between small throttle movements and speed changes. As may be seen, the throttle position curve comprises a series of frequent vertical variations. These variations, indicating small throttle movements, are representative of small changes in accelerator pedal pressure exerted by the driver's foot according to his reactions which may be only nervous rather than intentional ones. Each increase in pedal pressure tends to inject a "slug" of raw gasoline into the intake manifold, thereby increasing the charge to the engine cylinders with no immediate effect of a speed change. This increased charge without an apparent matching increase in engine power output, besides being wasteful of fuel as such, results in the formation of cylinder deposits and dilution of lubricating oil in the crank case.

For the reason that in previous dynamometric testing of automotive vehicles the aforementioned small throttle movements have not been imposed on the general throttle movement corresponding to speed changes the test results have not been fully accurate in terms of reproducing a road run of a driver-controlled vehicle. Taken another way, it is clearly evident from FIG. 5 that simply to reproduce conditions of over-the-road speed from a master test vehicle on that or another vehicle on a subsequent dynamometric test will lead to unrealistic results because speed is a much more slowly changing variable than throttle position, and it is throttle position and the changes thereof which have an immediate effect on gasoline consumption in either a useful or wasteful and injurious fashion.

Figure 6:
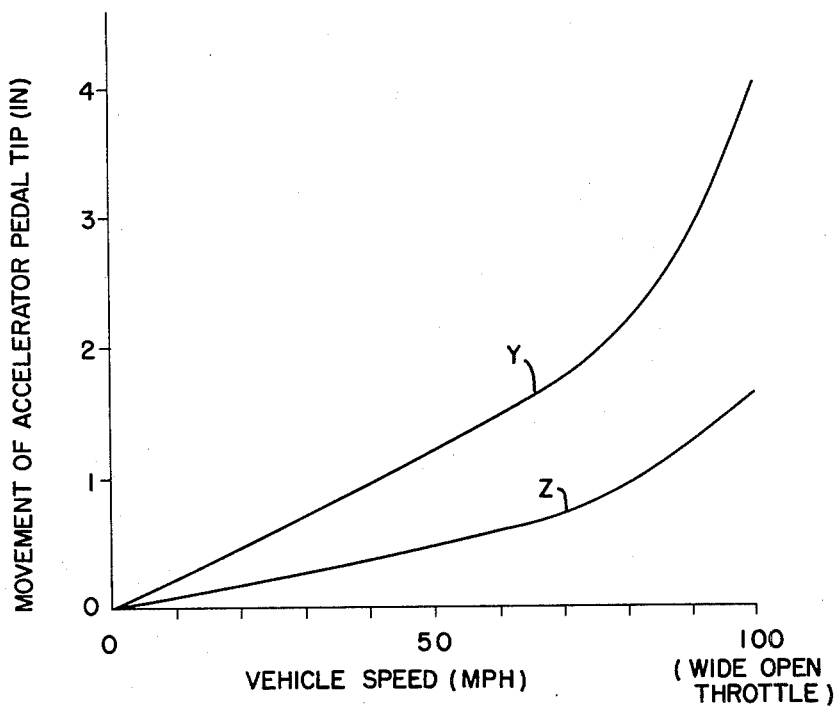
FIG. 6 represents comparative curves showing the relation of accelerator pedal position to vehicle speed for level road driving of modern passenger automobiles.

Referring now to FIG. 6, a basis for correlating the performance of modern passenger automobiles operable through the same speed range has been found regarding movement of the tips of their accelerator pedals with respect to vehicle speed for level road driving. The curves of FIG. 6 represent the boundaries of a group of curves of pedal tip movement with respect to level road speed taken from a large number of automobiles in which the wide open throttle condition corresponds to a speed of about 100 m.p.h. In curve Y taken from car "E" the pedal tip movement is about 1⅛" at 45 m.p.h., and about 4" at 100 m.p.h. or full throttle. In curve Z taken from car "B" the values of tip displacement for the same speeds and/or throttle condition are about ⁷⁄₁₆" and 1⅝" respectively. Curves Y and Z and all lying between them but not shown are linear out to approximately 70 m.p.h., a speed at and beyond which windage forces probably become quite significant. To correlate the curves, however, for purposes which will be made clear presently, be it noted that if a scale factor of approximately 2.50 be applied to ordinate values of curve Z a close reproduction of curve Y will be achieved. Curves for other vehicles lying between Y and Z would be reproduced with substantially the same degree of accuracy by applying an individually appropriate scale factor to curve Z.

Referring now to FIGS. 7 and 8 which are plan and sectional elevation views respectively of a typical installation of the mileage accumulation dynamometer of the road simulation system of this invention, 74 represents a concrete foundation structure having a floor element at a sub-surface level, and wall elements coming substantially even with the earth's surface. Structure 74 is the general means whereby and wherefrom support is furnished to all machine and machine bearing elements of the mileage accumulation dynamometer as is evident from the figures. Individual foundation, supporting, or shaft bearing means for particular components of the mileage accumulation dynamometer yet to be mentioned will not, therefore, be especially pointed out or described.

The evacuated space bounded by structure 74 will be accessible by suitable ladder or stairway means, and is covered by an appropriately supported deck structure 76. This deck is cut away in regions directly above two traction rolls 78 which are carried on a common axle 80 and spaced thereon corresponding to the rear wheels of a car. Running along deck 76 are two front tracks 82 and two rear tracks 84 which come to the edges of the cutway regions in the deck closely above traction rolls 78. Midway between rear tracks 84 on the wall of foundation structure 74 are two anchor points 86 whereat a car on test on the dynamometer may be secured. It is intended that when a vehicle is on test its rear wheels will be supported by rolls 78 and its front wheels by tracks 82. Yoke or bridle means will extend from the vehicle chassis to anchor points 86 to hold the vehicle horizontally stationary while its engine is being fired, and cause its rear wheels to drive rolls 78 accordingly.

At one end axle 80 extends beyond its bearing to carry a pulley or belt drum 88. From this drum a driving means 90, V-belts for example, extends to and around pulley 92 on one end of intermediate shaft 94 which is parallel to axle 80. Between its bearings intermediate shaft 94 carries a sprocket wheel 96 and a belt pulley 98. A chain belt 100 connects sprocket 96 to the shaft of a positive displacement hydraulic pump 102 which may conveniently and desirably be of the gear type capable of slipping when confronted by a blocked discharge line. The hydraulic system associated with pump 102 will be described presently. The chain belt may be enclosed by a suitable guard case 104. A multiple V-belt 106 connects pulley 98 on the intermediate shaft to pulley 108 on shaft 110 of a centrifugal fan which has a casing 112 and outlet duct 114. This duct is so shaped, positioned, and proportioned that air leaving it will impinge on a test vehicle across substantially the full front grille or radiator air inlet space thereof and also sweep the lower vehicle areas to serve as normal cooling air for the engine and the underbody near the engine.

At its end opposite to that on which pulley 92 is carried, intermediate shaft 94 is provided with an enlarged section 116. This section is characterized by a stop collar 118 at its end closest to a shaft bearing, and by a longitudinal key 120. In line with shaft section 116 and closely adjacent thereto is a separately supported, non-rotating shaft member 122 of the same diameter more or less. This latter shaft serves as a storage means for a plurality of inertia discs 124 which are slidably engaged thereon and provided with keyways of a size matched to key 120 on shaft section 116. When the intermediate shaft is stopped, one or more discs 124 may be slid onto enlarged section 116 making suitable engagement with key 120 and butting against collar 118. These discs so transferred from storage shaft 122 may be secured to the intermediate shaft and its collar and to each other by any appropriate means such as through bolts.

Now considering the hydraulic system associated with pump 102, the circulated fluid, preferably oil, leaving the discharge side of the pump arrives at a T-element 126 at which it divides to flow toward two back pressure regulating valves 128 and 130 which are arranged in parallel. These valves are provided with operating means comprising springs to hold them normally open and air-actuated diaphragms whereby the spring forces may be opposed and the valves closed. These operating means differ from each other from valve to valve in that one requires a higher air pressure than the other to be exerted against its diaphragm to effect closing. Valve 128 might, for example, close at lower air pressure than valve 130. More specifically, valve 128 might begin to close at air pressure of 2 p.s.i. exerted on its diaphragm and be fully closed at 9 p.s.i., while valve 130 closed over a range of 8 p.s.i. to 15 p.s.i. The air supply system for these valves is not shown in FIGS. 7 and 8, but is illustrated diagrammatically in and will be discussed further in connection with FIG. 9.

The outlet sides of valves 128 and 130 are joined by an appropriate T-fitting so that all oil from the pump flowing through both valves must pass through a common discharge line 132. This discharge line leads to a heat exchanger or oil cooling means 134 located within duct 114 of the centrifugal fan. This oil cooling means may be simply a sinuous pipe configuration provided with extended surfaces such as transverse fins. From the outlet of oil cooler 134 a pipe 136 leads to a tank or drum 138 which provides capacity in the hydraulic system. To complete and close this system, a pipe 140 leads from drum 138 to the suction side of pump 112. It may be noted that oil is actually pumped through drum 138, and that the liquid material therein does not simply float on the line.

The principal functions of the apparatus elements of FIGS. 7 and 8 as these elements serve to simulate level road conditions for a vehicle mounted on the mileage accumulation dynamometer are four: to provide an equivalent effective inertia load for acceleration purposes, to provide an equivalent effective wind resistance as this resistance comprises a load which must be overcome by engine power output, to provide cooling air, and to provide an equivalent effective braking force on the equivalent effective inertia.

Considering first the intertia problem, when a vehicle is being driven on the road the engine power requirement to effect a selected increase in speed within a given time period, that is, acceleration, will be a function of the mass of the vehicle. In over-the-road driving, vehicle accelerations will be linear. In the dynamometer of this invention, however, with the vehicle itself stationary in space acceleration must be effected in what is primarily a rotating system; that is, principally angular rather than linear accelerations will be realized. The rotating elements of the dynamometer will comprise traction rolls 78, axle 80, pulley 88, pulley 92, intermediate shaft 94, sprocket wheel 96, pulley 98, enlarged intermediate shaft section 116, stop collar 118, key 120, any discs 124 positioned on enlarged shaft section 116, the shaft of hydraulic pump 102 and all pump and pump drive elements attached thereto, pulley 108, and fan shaft 110 and all fan elements attached thereto. In addition there will be other dynamometer elements subject to acceleration of a not entirely angular nature. These elements include belts 90, 100, and 106.

By well known mathematical means the dynamometer elements subject to acceleration by the vehicle on test may be reduced to a single rotating body having a particular moment of inertia and turning at the speed of axle 80. The engine power required to generate the torque on rolls 78 to accelerate such a rotating body through a given range of angular speeds is to be equated to the power required to accelerate the mass of the vehicle, its passengers, and baggage through a given range of linear speeds over the road. Such equality may be achieved in respect of any vehicle on test by providing such mass in the dynamometer system to give a proper moment of inertia to be "seen" by the driving means of the system, that is, the surfaces of the rear tires of the vehicle, as this means comes in contact with the system at its driving points which are the surfaces of rolls 78.

There will be at least some fixed mass in the dynamometer subject to acceleration. The dynamometer must, however, be capable of accommodating vehicles having a range of total mass, that is, the basic mass of the vehicle plus any specified imposed mass such as that of passengers and baggage. There must, accordingly, be a variable mass capability in the dynamometer system. This is found in the arrangement whereby one or more inertia discs 124 may be shifted from storage shaft 122 onto the enlarged section 116 of intermediate shaft 94, and hence become rotating elements subject to acceleration. By selection of the proper number of discs 124 to be turned by the intermediate shaft the mass of the mileage accumulation dynamometer may be adjusted to provide an effective inertia load for acceleration by the engine of any vehicle on test on the dynamometer equivalent to the inertia load in normal driving due to the mass of the vehicle and of the people and material carried therein.

Considering next the wind resistance problem, let it be pointed out first of all that no load is imposed directly on the engine of a vehicle on test by any impulse or friction drag effect which the air from the centrifugal fan leaving duct 114 may have on the vehicle. The only immediately significant effect of air leaving this duct and impinging on the vehicle is to cool the vehicle's engine and underbody. This effect has been pointed out earlier in the present discussion of FIGS. 7 and 8. Engine and transmission loading of an amount corresponding to the power needed to overcome wind resistance at any speed on an actual road run is represented by the power which the car on test must develop to turn shaft 110 of the centrifugal fan. As the test car engine is accelerated and traction rolls 78 driven faster, the fan will be speeded up and the power absorbed by it increased. Generally speaking, power required in an automobile to overcome wind resistance varies as the cube of speed over the road. Likewise, power absorbed by a centrifugal fan varies as the cube of angular speed for substantially constant discharge conditions. Accordingly, if the centrifugal fan and its ductwork are so sized and the belt and pulley arrangement by which power is transmitted to the fan have such a ratio that for any given speed of the rear wheels of the car on test the power absorbed by the fan is the substantial equal of that needed by the vehicle to overcome wind resistance at a road speed corresponding to the rate of rotation of the rear wheels, the fan system will be correctly proportioned and driven for all rear wheel speeds of the car on test.

Considering finally the braking problem as equipment for dealing with this problem appears in FIGS. 7 and 8, it should be understood clearly that no attempt is made to utilize the brakes on the test vehicle itself in place on the mileage accumulation dynamometer. This is because vehicle brakes generally apply to both front and rear wheels, and it is evident that since the front wheels of the vehicle on dynamometric test are always idle any brake force exerted on them would be without significance while that which was available at the rear wheels would not in many cases be adequate to control the effective inertia of the dynamometer. Accordingly an entirely distinct brake load simulating system is provided as part of the dynamometer itself.

This brake load simulating system so far as it appears in FIGS. 7 and 8 comprises positive displacement pump 102, the hydraulic circuit already described through which this pump passes oil, and the system of pulleys, sprockets, V-belts, and chain belts whereby driving torque is transmitted from the traction rolls 78 to pump 102. With any increase in pumping resistance of the hydraulic circuit the power required to be transmitted from the traction rolls to drive the pump at a constant speed will be increased also. Consequently, such an increase in circuit resistance will tend to slow down the rolls, and, in effect, exert a braking force on the equivalent effective inertia of the dynamometer system.

Ordinarily with back pressure regulating valves 128 and 130 open the power output to drive pump 102, traceable eventually back to the engine of the vehicle on test, will be negligible in respect of other power requirements which this engine must satisfy. As valves 128 and 130 are closed, however, by admission of air under pressure to their diaphragm actuating chambers the pumping resistance will rise to throw a very substantial decelerating or braking load on the equivalent effective inertia of the dynamometer system, and through it load and slow down the rear wheels and engine of the vehicle being tested. The method and means of putting the brake load simulating system into action and of releasing it will be discussed further in connection with FIG. 9 and later figures. It may be remarked now, however, that valves 128 and 130 close sequentially and at relatively slow rates to give an effect of brake load applied rather gradually. The cooling of hydraulic oil in heat exchanger 134 will be substantially aided by air from the centrifugal fan sweeping over the external surfaces of this exchanger.

Referring now to FIG. 9, 142 designates a tape playback mechanism designed to reproduce electrically signals previously recorded on a magnetic tape. In particular, player 142 is designed to operate on the tape generated in recorder 68. The output of playback mechanism 142 comprising an audio frequency signal is fed to amplifier 144 which may be of conventional design. The amplified signal comprising the output of this device is transmitted to filters 146 and 148 in parallel. Filter 146 has band pass characteristics; that is, it transmits frequencies only in the approximate range of 2,000 to 3,000 cps. Filter 148 has band pass characteristics also, but very narrow ones. It transmits only frequencies very closely around 280 cps.

Now tracing the output from filter 146, a signal of variable frequency is impressed upon frequency to D.C. voltage converter 150 which serves to generate a direct voltage whose magnitude will vary with respect to frequency of the input signal to converter 150. The preferred relation of D.C. voltage output to frequency input to converter 150 will be a linear one. In this case, refering back to FIGS. 1, 2, and 4, it may be seen that D.C. voltage output of converter 150 will vary linearly with throttle connecting rod movement in the original recording run. The output signal from converter 150 is transmitted to an accelerator pedal actuating apparatus designated generally as 152 and located within the car 154 which is on test on the mileage accumulation dynamometer shown schematically in FIG. 9.

The actuating apparatus 152 has both electrical and mechanical components, and amplifies the input signal from converter 150 to a power level sufficient to operate the throttle mechanism of the dynamometer test car. A more complete description of apparatus 152 is given in connection with later figures. It may be stated here, however, that the travel of the stroking mechanism of the accelerator pedal actuating apparatus which is the output quantity of this apparatus is linear with respect to variation of the D.C. voltage output of converter 150. Accordingly, the travel of the accelerator pedal 156 in the car positioned on the dynamometer will be in a constant ratio to if not precisely equal to that recorded in the master test vehicle actually driven on the road.

Reference should be had here to the comparative curves of FIG. 6 showing the relation of accelerator pedal tip displacement to vehicle speed for level road driving of two representative passenger automobiles and to the discussion of FIG. 6 pointing out how a substantially constant scale factor could be used to go from one to the other with a basic requirement that the cars be operable over substantially the same speed range. With this in mind it may be seen that once a car has been set up for test on the mileage accumulation dynamometer it need be motored to find the displacement of the tip of its accelerator pedal at a single speed only, 45 m.p.h. for example. The scale factor to relate it to the vehicle with which the master test run on the road was performed and from which the tape record to be played back was taken may then be determined, and the electrical circuit of the actuator apparatus 152 so adjusted to give a mechanical motion of the stroking means of this apparatus in respect of the accelerator pedal 156 of the car on the dynamometer to obtain proper pedal movement in this car for 45 m.p.h. on the tape record. The nature of the above electrical adjustment will be described presently. After this the dynamometer test car will have proper pedal movement imposed on it for the whole run of the tape. This all allows a multiple dynamometer installation to be constructed and a plurality of cars of different makes although of substantially equal speed ranges to be operated simultaneously from a single master tape.

Next tracing the output from filter 148, an alternating voltage of substantially constant frequency will be imposed intermittently upon the A.C. amplifier-rectifier and relay 158, energizing the relay component from time to time corresponding to the brake signals recorded in the master test vehicle on its road run as described previously. There will, of course, be a substantial electric power input to 158 which will constitute the output of this device when the relay component thereof is closed. This output signal is fed to an electrical-to-air relay 160 having an input of air at substantial pressure which will constitute the output of 160 when the electrical component of this device is energized by a signal from 158 to open suitable valving therein. Air from relay 160 flows to the diaphragm mechanism of valves 128 and 130 closing these valves in sequence as pressure builds up on their diaphragms. According to the example given previously, valve 128 will be substantially fully closed when the closing of valve 130 is just beginning.

The extent of closing of valves 128 and 130 and, consequently, the hydraulic resistance imposed in the circuit of pump 102 with its attendant braking effect on the dynamometer system will depend on how long relay 160 is energized. This in turn is a function of the length of time the brake pedal in the master test vehicle used in the road run is depressed. Even if the valves both go fully closed the dynamometer system will be able to move slightly to consume its residual kinetic energy in churning the fluid trapped in gear pump 102 as this pump slips. Thus the hydraulic brake load simulating apparatus cannot drive solid with the attendant possibility of rupture of lines and fittings.

After relay 160 opens with the termination of the braking signal, air will bleed from the diaphragm mechanisms of valves 128 and 130 to allow these valves to open with consequent reduction of resistance in the pump circuit and freeing of the dynamometer system. It has been stated previously that during the master test run on the road the driver is instructed to keep his brake pedal depressed all through a stop period. This is to give the dynamometer system all the opportunity possible to be brought to a stop by extended closing of valves 128 and 130 during a time corresponding to one in which the master test vehicle was in fact stationary Refer now to FIG. 10 which shows the linear characteristic preferred in frequency to D.C. voltage converter 150. This characteristic and its significance in operation of the playback and accelerator pedal actuating system shown in FIG. 9 has been pointed out already.

Referring now to FIG. 11, the input terminals of the electrical circuit associated with the accelerator pedal actuating apparatus 152 are 162 and 164, and these receive the D.C. voltage generated in converter 150. An input resistor $R_4$ is connected across these terminals with one end going to ground. From the other end of $R_4$ connection is made to one side of an error amplifier 166. The other side of this amplifier receives a signal from a balancing potentiometer or voltage divider circuit having an output slider 168. The nature and control of this circuit will be described in greater detail presently.

The function of error amplifier 166 is to compare the voltages impressed on it from the frequency to D.C. voltage converter on the one hand and the balancing potentiometer on the other, and to amplify any difference between these voltages, this difference being known as error. The amplified error signal comprising the output of 166 is fed to a current amplifier 170 in which a current signal is generated of sufficient magnitude to comprise the armature current of a D.C. motor 172. This motor is characterized by field poles which are permanent magnets and by an output shaft 174. Motor 172 is reversible, and its direction of rotation at any given time will depend on the direction of current furnished to its armature windings from amplifier 170. The direction of this current will in turn depend upon the direction of voltage inequality or error measured by amplifier 166. Likewise the magnitude of the armature current will depend upon the magnitude of the voltage error.

Output shaft 174 of motor 172 carries a gear 176 and a pinion 178. Pinion 178 meshes with a toothed quadrant or other arc sector 180 which is rotatably mounted on a shaft 182. As motor 172 is operated quadrant 180 will be turned one way or the other on shaft 182, and the motion of this quadrant will be imposed on accelerator pedal 156 of the car on test on the dynamometer. This imposition is shown diagrammatically only in FIG. 11, but is particularly illustrated structurally in FIG. 12 which will be considered presently.

Now in FIG. 11, however, attention should be directed to the balancing potentiometer circuit which comprises a battery $B_2$, a slope resistor $R_5$, a slider 184 making contact with the slope resistor, a balancing potentiometer or voltage divider resistor $R_6$ grounded at one side, and the previously noted output slider 168 bearing on $R_6$. It will be convenient if $R_6$ be in the form of a ten-turn or 3600° potentiometer comprising a resistor coiled in a spiral. Its slider 168 will then move in rotation, and this construction is assumed. On the shaft of slider 168 is a pinion 186 which meshes with gear 176 on output shaft 174 of D.C. motor 172. It may be seen, accordingly, that as motor 172 is operated not only will quadrant 180 be moved, but also slider 168 will be shifted on potentiometer $R_6$. Shifting of slider 168 will alter the voltage input from the balancing potentiometer circuit to error amplifier 166. It may be seen, therefore, that a feedback loop is created.

Battery $R_2$ establishes a reference voltage in the balancing potentiometer circuit. The setting of slider 184 on slope resistor $R_5$ determines the voltage drop available across potentiometer $R_6$. With more of $R_5$ in the circuit the voltage available across $R_6$ will be decreased and vice versa. With decreased voltage available across $R_6$, slider 168 must be positioned farther along $R_6$ from the grounded or zero voltage end thereof to impress sufficient voltage on error amplifier 166 from the balancing potentiometer circuit to match a given voltage input to 166 from converter 150 and hence reduce the error output from 166 to zero. With zero output from the error amplifier, of course, there will be no armature current to motor 172, and quadrant 180 and accelerator pedal 156 will be stationary. The extent of travel of quadrant 180 and hence the change in position of dynamometer car accelerator pedal 156 in response to a given change in D.C. voltage imposed on terminals 162 and 164 will thus depend on the setting of slider 184 on slope resistor $R_5$. It is by means of this slider that the scale factor relating the curves of accelerator pedal position to speed for various cars of the same speed range shown in FIG. 6 and mentioned later in connection with FIG. 9 is introduced to allow one or a plurality of cars on test on a single or multiple dynamometer installation to be operated from a single tape record of accelerator pedal position taken in a master test run over-the-road by a driver-controlled car. To obtain increased motion of the accelerator pedal of the dynamometer test car, more of slope resistor $R_5$ should be put into the balancing potentiometer circuit, and to scale down this motion the effective value of $R_5$ in the balancing circuit should be decreased.

Referring now to FIG. 12, the shaft 182 on which quadrant 180 is rotatable may be carried in a bracket 188 mounted on the floorboard 190 of a car installed for test on the mileage accumulation dynamometer of the road simulation system of this invention. Quadrant 180 is characterized by an arm-like extension 192 as shown. Accelerator pedal 156 is attached to the floorboard at pivot 194. Accelerator connecting rod 196 extends forward through the floorboard from pivot 198 on pedal 156. The quadrant and the accelerator pedal are joined by a linkage whereby a parallelogram of motion is created.

The joining linkage comprises an over-fitting clamp block 200 on quadrant arm 192, a similar block 202 on accelerator pedal 156, a slotted link 204 pivoted on pin 206 in block 200, a drilled and tapped link 208 pivoted on pin 210 in block 202, and two screws 212 passing through the slot in link 204 into the threads in link 208 by which screws links 204 and 208 are joined to form a rigid structure of adjustable length. For the necessary parallelogram, block 200 must be adjusted on arm 192 and block 202 on pedal 156 to give equal distances from pivot 206 to shaft 182 and pivot 210 to pivot 194. Just what these distances will equal in practice will be determined by the configuration of the particular vehicle on test. With this equality established, links 204 and 208 should be relatively adjusted to give equal distances from pivot 206 to pivot 210 and shaft 182 to pivot 194. Once this parallelogram is in being, rotational motion imposed on quadrant 180 by pinion 178 on motor shaft 174 will be accurately translated into linear motion of accelerator connecting rod 196.

Referring now to FIG. 13, the mechanical motion of an appropriate point on the accelerator pedal actuating mechanism, pivot point 206 on block 200 on quadrant arm 192 for example, appears as a linear function of the D.C. voltage input to the actuator apparatus 152 from converter 150. This motion will also be that of a corresponding point on the dynamometer test car accelerator pedal 156 which will be transmitted to the throttle of that car through whatever throttle linkage is installed therein. This represents the final conversion of signals in the playback and actuation process for dynamometer test car accelerator pedal control. The object sought and achieved is to have this pedal moved in precisely linear relation to the pedal movement recorded in the master test run with a proper scale factor applied to give correspondence of over-the-road speeds in substantially level driving. A fairly short master test record may be played repetitively an indefinite number of times to give as long-continued a dynamometer test run as desired.

Referring now to FIG. 14, the general relation between torque required to drive hydraulic pump 102 of the brake load simulating apparatus and the back pressure against which this pump operates is shown to be linear. This relation is characteristic of gear-type, positive displacement pumps. It may be seen, therefore, that as back pressure regulating valves 128 and 130 are closed to restrict the discharge line from and so build up back pressure against pump 102 in the braking system the required driving torque will increase. This torque requirement increase, reacting through the dynamometer system, will cause the traction rolls 78 and all other moving elements including the pump itself to slow down. As the pump is slowed the quantity of hydraulic oil displaced per unit time will decrease while back pressure continues to rise.

Assuming the braking signal is sufficiently long continued, valves 128 and 130 will go fully closed to block the pump discharge line completely. If the pump be still turning at this point it will still be displacing liquid against a rather high back pressure. Since the displaced liquid cannot get out through the discharge line, it will all have to return to the suction side of the pump through the clearance between the gears and the casing. This represents the condition of slipping. The pressure differential which must exist across the pump for a substantial quantity of the displaced liquid to recycle internally will depend on the relative closeness of fit of the pump parts.

A rather loosely fitted pump will slip markedly at a comparatively low back pressure, assuming suction pressure to be negligible. Discharge valves may safely be closed fully against such a pump. For a rather closely fitted pump, however, a relief valve may have to be provided to guard against excessive pressures prior to full slipping when the discharge line is shut off and the pump is still turning. Pump 102 of the mileage accumulation dynamometer of the road simulation system of this invention may be protected by such a valve in addition to its inherent slipping characteristic. It is to be expected, however, that with back pressure regulating valves 128 and 130 closing in sequence and rather slowly the moving parts of the dynamometer system may be brought very close if not fully to a stop before the valves go altogether shut, and hence the need of protecting the hydraulic system by pump slippage or lifting of a relief valve will be a brief and intermittent one in any case.

Although this invention has been described with a certain degree of particularity, it is to be understood that the present disclosure has been made only by way of example and that numerous changes in the details of construction and the combination and arrangement of parts may be resorted to without departing from the spirit and scope of this invention as hereinafter claimed.

What is claimed is:

1. A method for the accumulation of operational mileage on a throttle-controlled motor vehicle having a wheel brake system and at least one wheel wherethrough driving force is transmitted, which method comprises the steps of test driving said motor vehicle on an actual roadway for a relatively short master test run; continuously measuring and recording with respect to time during said master test run the position of a selected point in the mechanism whereby the throttle is actuated, which point moves in accordance with changes in throttle position; recording brake impulses with respect to time during said master test run; thereafter affixing said vehicle in a stationary position with its wheel wherethrough driving force is transmitted in contact with a traction roll; firing the motor of said vehicle and regulating the position of the mechanism whereby the throttle is actuated with respect to time in a schedule similar to the position record taken during said master test run, and concurrently imposing a braking load upon said traction roll in a schedule similar to the brake impulse record taken during said master test run.

2. A method according to claim 1 including the step of continuously driving a fan from said traction roll, said fan as driven from said roll having a power requirement essentially equal to that of said vehicle to overcome wind resistance at an over-the-road speed corresponding to the rate of rotation of the power transmitting wheel of said vehicle in contact with said traction roll.

3. A method according to claim 1 in which said step of recording the position of a selected point in the mechanism whereby the throttle is actuated creates a continous magnetic tape record signal modulated by frequency in the range of 2,000 to 3,000 cycles per second, and said step of recording brake impulses creates an intermittent magnetic tape record signal with a substantially constant frequency of about 280 cycles per second.

4. A method for the accumulation of operational mileage on a first throttle-controlled motor vehicle having a wheel brake system and at least one wheel wherethrough driving force is transmitted, which method comprises the steps of test driving a second throttle-controlled motor vehicle having similar braking and power transmitting means and operable over substantially the same speed range as said first vehicle on an actual roadway for a relatively short master test run; continuously measuring and recording with respect to time during said master test run the position of a selected point in the mechanism whereby the throttle of said second vehicle is actuated, which point moves in accordance with changes in throttle position; recording brake impulses with respect to time during said master test run; determining the ratio of throttle actuating mechanism displacements at corresponding points thereof between said first and second vehicles for a selected over-the-road speed; thereafter affixing said first vehicle in a stationary position with its wheel wherethrough driving force is transmitted in contact with a traction roll; firing the motor of said first vehicle and regulating the position of the mechanism whereby the throttle thereof is actuated with respect to time in a schedule similar to the position record taken during the master test run of said second vehicle, said schedule including as a factor said ratio of throttle actuating mechanism displacements, and concurrently imposing a braking load upon said traction roll in a schedule similar to the brake impulse record taken during the master test run of said second vehicle.

5. A method according to claim 4 including the step of continuously driving a fan from said traction roll, said fan as driven from said roll having a power requirement essentially equal to that of said first vehicle to overcome wind resistance at an over-the-road speed corresponding to the rate of rotation of the power transmitting wheel of said first vehicle in contact with said traction roll.

6. A method according to claim 4 in which said step of recording the position of a selected point in the mechanism whereby the throttle of said second vehicle is actuated creates a continuous magnetic tape record signal modulated by frequency in the range of 2,000 to 3,000 cycles per second, and said step of recording brake impulses in said second vehicle creates an intermittent magnetic tape record signal with a substantially constant frequency of about 280 cycles per second.

7. A method for the accumulation of operational mileage on a throttle-controlled motor vehicle having at least one wheel wherethrough driving force is transmitted, which method comprises the steps of test driving said motor vehicle on an actual roadway for a master test run; continuously measuring and recording with respect to time during said master test run the position of a selected point in the mechanism whereby the throttle is actuated, which point moves in accordance with changes in throttle position; thereafter affixing said vehicle in a stationary position with its wheel wherethrough driving force is transmitted in contact with a traction roll, said roll being coupled to such movable mass that an effective inertia equivalent to that of said vehicle in linear driving exists at said roll as it is in contact with said wheel of said vehicle, and firing the motor of said vehicle and regulating the position of the mechanism whereby the throttle is actuated with respect to time in a schedule similar to the position record taken during said master test run.

8. A method for the accumulation of operational mileage on a first throttle-controlled motor vehicle having at least one wheel wherethrough driving force is transmitted, which method comprises the steps of test driving a second throttle-controlled motor vehicle having similar power transmitting means and operable over substantially the same speed range as said first vehicle on an actual roadway for a master test run; continuously measuring and recording with respect to time during said master test run the position of a selected point in the mechanism whereby the throttle of said second vehicle is operated, which point moves in accordance with changes in throttle position; determining the ratio of throttle actuating mechanism displacements at corresponding points thereof between said first and second vehicles for a selected over-the-road speed; thereafter affixing said first vehicle in a stationary position with its wheel wherethrough driving force is transmitted in contact with a traction roll, said roll being coupled to such movable mass that an effective inertia equivalent to that of said first vehicle in linear driving exists at said roll as it is in contact with said wheel of said first vehicle, and firing the motor of said first vehicle and regulating the position of the mechanism whereby the throttle thereof is actuated with respect to time in a schedule similar to the position record taken during the master test run of said second vehicle, said schedule including as a factor said ratio of throttle actuating mechanism displacements.

References Cited in the file of this patent

UNITED STATES PATENTS

| | | |
|---|---|---|
| 1,964,532 | Platzer | June 26, 1934 |
| 2,248,938 | Bennett | July 15, 1941 |
| 2,414,356 | Bogen | Jan. 14, 1947 |
| 2,513,816 | Patterson et al. | July 4, 1950 |
| 2,669,870 | Bennett | Feb. 23, 1954 |
| 2,685,199 | Wilson et al. | Aug. 3, 1954 |
| 2,714,202 | Downing | July 26, 1955 |
| 2,755,422 | Livingston | July 17, 1956 |
| 2,924,095 | Worstel | Feb. 9, 1960 |

FOREIGN PATENTS

| | | |
|---|---|---|
| 620,703 | France | Jan. 24, 1927 |